Jan. 3, 1956 K. KNICKERBOCKER 2,729,404
FILM CARRYING REEL
Filed June 14, 1952
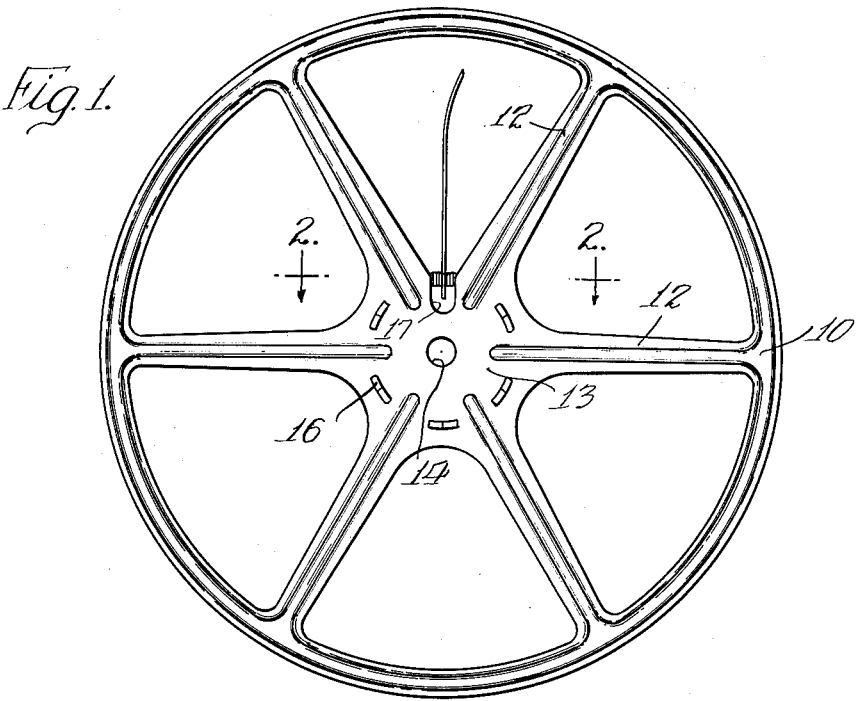
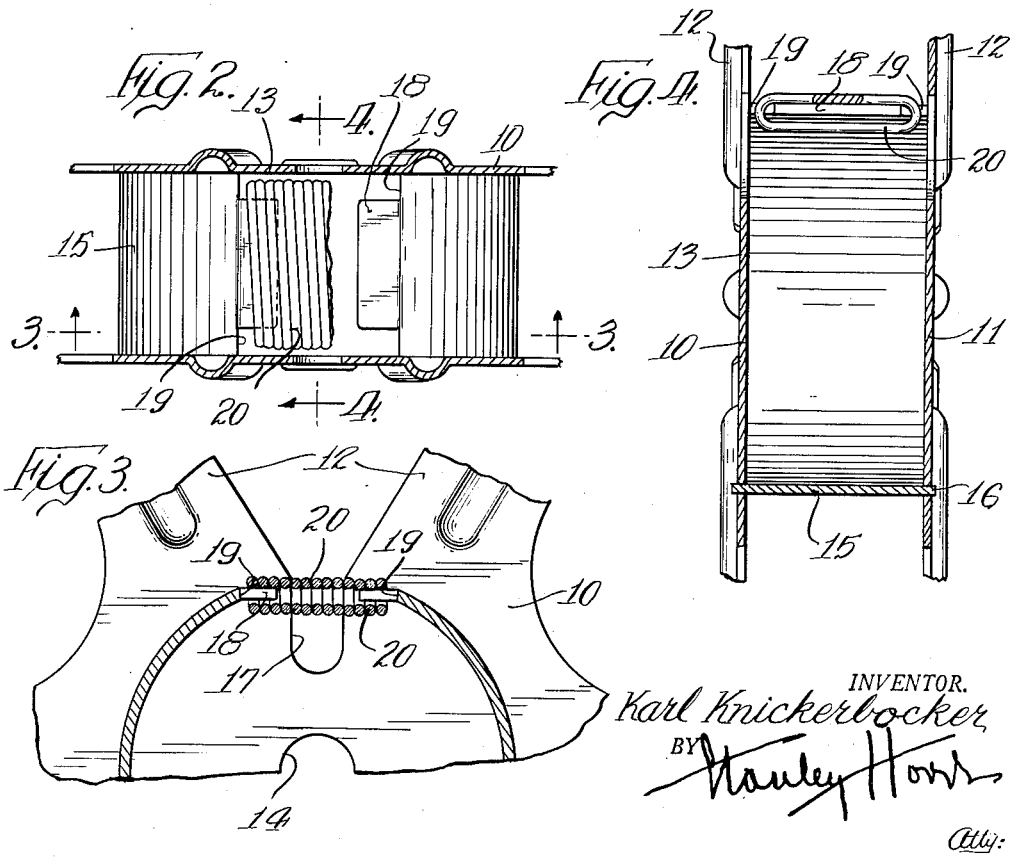
INVENTOR.
Karl Knickerbocker
BY
Atty:

United States Patent Office 2,729,404
Patented Jan. 3, 1956

2,729,404
FILM CARRYING REEL

Karl Knickerbocker, Mount Prospect, Ill.

Application June 14, 1952, Serial No. 293,504

2 Claims. (Cl. 242—74)

This invention relates to an improved film carrying reel and more particularly a reel of this type having means at the hub for gripping the end portion of a strip of film to be wound on said reel which includes a coiled spring having a series of adjacent pairs of turns between which the film has edgewise entry axially of the hub.

One object of this invention is to provide an exceedingly simple and easily constructed form of means for supporting and holding the coiled spring in a reel of this type.

The reel forming the subject of this invention features a hub having integral means defining a pair of oppositely disposed tongues or lugs in spaced apart relation circumferentially of the hub and spaced centrally inwardly from the surfaces of the side plates opposite said lugs, and a coiled spring bridging the space between said lugs and having its opposite end portions telescopically positioned on said lugs.

Other objects of this invention will in part be obvious and will in part appear hereinafter.

The invention accordingly comprises the features of construction, combination of elements, and arrangement of parts, which will be exemplified in the construction hereinafter set forth and the scope of the invention of which will be indicated in the appended claims.

For a fuller understanding of the nature and objects of the invention, reference should be had to the following detailed description taken in connection with the accompanying drawings, in which:

Fig. 1 is a side elevational view of a film carrying reel characterized by the features of this invention.

Fig. 2 is an enlarged fragmentary sectional view taken on line 2—2 of Fig. 1, with part of the coiled spring removed to illustrate the relative position of the lugs and the side plates of the reel.

Fig. 3 is a similar view taken on line 3—3 of Fig. 2, showing the coiled spring in telescopic arrangement over each lug.

Fig. 4 is an enlarged fragmentary sectional view taken on line 4—4 of Fig. 2 showing relative size of coil spring and the lugs.

Reference being had more particularly to the drawings, numerals 10 and 11 designate a pair of side plates of uniform size and shape, each having sector-shaped open areas defining spokes or arms 12 in radial relation to a central area 13 which is pierced by a suitable shaft receiving opening 14. The side plates are secured in rigid spaced apart co-axial relation by means of a hub, which as shown in the drawing, comprises a sheet metal strip 15 bent into a shape conforming to the arc of a circle having a radius slightly less than the radius of the central area 13 and concentric with the shaft receiving opening 14 but of such length less than the circumference of such a circle as to present the ends of the strip 15 in spaced apart relation. The central area 13 of the side plates 10 and 11 is provided with openings through which ears 16 formed integrally with the hub strip 15 and extending axially therefrom are projected and staked to rigidly join the side plates 10 and 11 in coaxially aligned relation.

Opposite the gap presented between the confronting ends of the strip 15, the central area 13 of each of the side plates 10 and 11 is notched or recessed radially inwardly from the edge thereof as at 17. The end portions of the hub strip 15 so spaced apart opposite the notch 17 in the side plates 10 and 11 are flattened, as shown in Fig. 3, so as to lie in a single common plane across the space and are of such reduced dimension relative to the axial dimension of the hub from which said ends project as to present tongues 18 which are offset centrally inwardly from the plates 10 and 11. A shoulder 19 is thus formed at opposite sides of each tongue 18 where the latter joins the portion of the hub strip 15 from which the tongue projects.

The space between the tongues 18, as shown in Fig. 3, is bridged by a coil spring 20 having its turns about an axis extending lengthwise of the distance between the tongues 18 and having the end portions thereof telescopically fitted over the tongues 18. The spring 20 is of such contour as to present opposed parallel surfaces axially of the hub at a distance apart slightly greater than the dimension of the tongues 18 measured radially of the hub and such parallel surfaces of the spring 20 are joined by curved ends at a distance apart slightly greater than the dimension of the tongues measured axially of the hub. Thus the spring 20 has slight play relative to the tongues 18 in directions axially and radially of the hub while the shoulders 19 are at such distance apart circumferentially of the hub as to permit slight play of the spring relative to such shoulders in directions circumferentially of the hub. Accordingly the support furnished the spring 20 by the tongues 18 prevents any binding engagement therebetween which would hinder the separation of adjacent turns of the coil spring to accommodate ready entry of the edge of the film strip when the latter is introduced edgewise in directions axially of the hub as shown in Fig. 1. It will be further noted from Fig. 3, that the tongues 18 are so disposed with reference to the edges of the notch 17 in the plates 10 and 11 as to avoid any obstruction across the area of the notch. The notch 17 extends a substantial distance radially inward from the innermost side of the spring so as to provide ample room for the end section of the film to extend within the hub thereby facilitating entry of the film to the turns of the spring.

It will thus be seen that the present invention affords an exceedingly simple construction of spring support in a film carrying reel of the type described.

What is claimed is:

1. In a film reel, a pair of side disks, a hub to which said disks are secured centrally in spaced parallel relation, said hub having circumferentially spaced apart peripheral portions defining spaced spring supporting means having a gap therebetween, and means for securing a film end to said first mentioned means, said means including a coiled spring supported by said hub across said gap between said portions with the turns of the spring arranged about an axis extending in a plane substantially along the periphery of the hub, and the turns of the spring presenting opposed parallel surfaces axially of the hub joined by curved ends and said parallel surfaces being spaced apart a distance substantially less than the distance between said curved ends.

2. In a film reel, a pair of side disks, a hub to which said disks are secured centrally in spaced parallel relation, said hub comprising a band having a pair of opposed spaced apart end sections and a body portion intermediate said ends bowed throughout its length to conform to the curvature of a circle, said end portions presenting side edges offset inwardly from the side edges of the body portion to define a shoulder at the junction of each end section and said body portion, and a coiled spring of elongated transverse cross-sectional contour in directions axially of the hub of such length as to bridge the space between said end sections and presenting open ends into which said end sections are received to trap the spring against unintentional removal from said end sections while providing a clearance between said shoulders and the surface of the spring facing said shoulders to accommodate expansion of said spring upon insertion of a film end between adjacent convolutions of said spring.

References Cited in the file of this patent

UNITED STATES PATENTS

| | | | |
|---|---|---|---|
| D. 34,750 | Adair | July 9, | 1901 |
| 1,429,692 | Passavanti | Sept. 19, | 1922 |
| 1,503,896 | Harris | Aug. 5, | 1924 |
| 1,506,327 | Perrault | Aug. 26, | 1924 |
| 2,226,825 | McAuley | Dec. 31, | 1940 |
| 2,619,299 | Chappuis | Nov. 25, | 1952 |
| 2,638,284 | Rahfuse | May 12, | 1953 |
| 2,653,775 | Eastman | Sept. 29, | 1953 |